(12) United States Patent
Pasanen et al.

(10) Patent No.: US 7,782,895 B2
(45) Date of Patent: Aug. 24, 2010

(54) APPARATUS, AND ASSOCIATED METHOD, FOR ALLOCATING DATA FOR COMMUNICATION UPON COMMUNICATION CHANNELS IN A MULTIPLE INPUT COMMUNICATION SYSTEM

(75) Inventors: Pirjo Pasanen, Vantaa (FI); Olav Tirkkonen, Helsinki (FI); Victor Stolpman, Irving, TX (US); Mihai Ionescu, Dallas, TX (US); John Terry, Garland, TX (US)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 11/196,778

(22) Filed: Aug. 3, 2005

(65) Prior Publication Data

US 2007/0030825 A1 Feb. 8, 2007

(51) Int. Cl.
*H04J 3/16* (2006.01)
*H04J 3/22* (2006.01)

(52) U.S. Cl. ............... 370/465; 370/464; 370/479; 370/252; 370/329; 370/332; 370/431; 370/437; 455/452.1; 455/452.2; 455/522; 455/67.11; 455/67.13; 455/68; 455/69; 455/561

(58) Field of Classification Search ........... 370/335, 370/342, 441, 479, 329, 468, 252, 345, 346, 370/348, 330, 395, 332, 431, 437, 464, 465; 455/450, 451, 452.1, 452.2, 522, 67.11, 67.13, 455/68, 69, 561

See application file for complete search history.

(56) References Cited

U.S. PATENT DOCUMENTS

| | | | | |
|---|---|---|---|---|
| 5,914,950 A * | 6/1999 | Tiedemann et al. | ......... | 370/348 |
| 6,259,746 B1 | 7/2001 | Levin et al. | | |
| 7,054,293 B2 * | 5/2006 | Tiedemann et al. | ......... | 370/335 |
| 2004/0114566 A1 * | 6/2004 | Lim et al. | ................... | 370/349 |
| 2006/0126749 A1 * | 6/2006 | Armour et al. | ............... | 375/260 |

FOREIGN PATENT DOCUMENTS

| | | |
|---|---|---|
| EP | 0753 948 A1 | 1/1997 |
| EP | 1533 966 A2 | 5/2005 |

OTHER PUBLICATIONS

"Adaptive Multilevel Coding in OFDM Systems", Vehicular Technology Conference, Spring 2005, vol. 3, pp. 1566-1570, Publication date May 30-Jun. 1, 2005.

* cited by examiner

*Primary Examiner*—Tuan A Tran
(74) *Attorney, Agent, or Firm*—Squire, Sanders & Dempsey, LLP

(57) ABSTRACT

Apparatus, and an associated method, for allocating data to communication channels of a multiple-input communication system and to select power levels at which the data is caused to be communicated upon the communication channels. Data allocation is made responsive to communication quality indications that identify communication conditions on the different ones of the channels. Data allocation and power level allocation is made to achieve best a selected performance parameter.

18 Claims, 2 Drawing Sheets

APPARATUS, AND ASSOCIATED METHOD, FOR ALLOCATING DATA FOR COMMUNICATION UPON COMMUNICATION CHANNELS IN A MULTIPLE INPUT COMMUNICATION SYSTEM

The present invention relates generally to a manner by which to communicate data in a multiple input communication system, such as an MIMO (Multiple Input Multiple Output) OFDM (Orthogonal Frequency Division Multiplexing) radio communication system. More particularly, the present invention relates to apparatus, and an associated method, by which to allocate data for communication upon separate ones of the multiple channels defined in the multiple input communication system.

The data is allocated in manners best to communicate the data according to a selected performance criteria. Channels that exhibit better communication qualities are allocated with greater amounts of data, and channels that exhibit poorer communication qualities are allocated with lesser amounts of data. Communication quality identifiers are constructed and used to describe channel quality. An ordered list is formed that identifies the channels and their qualities. And, the data is allocated for loading to be communicated upon the channels according to their ordering on the list.

BACKGROUND OF THE INVENTION

Many, if not most, in modern society require access to communication systems in which communication data is communicated pursuant to effectuation of communication services. During operation of a communication system, the communication data is communicated between a set of communication stations including at least a sending station and a receiving station. The sending and receiving stations are interconnected by way of a communication channel. Communication data is communicated by the sending station upon the communication channel. And, the receiving station protects the communicated data and operates to recover the information content of the detected data.

Many different types of communication systems have been developed and deployed, of differing characteristics and capabilities, amenable for effectuating different types of communication services. Some of the communication systems are multi-user communication systems, permitting large numbers of users to communicate by way of such communication systems. And, advancements in technology permit, new communication systems shall likely be developed and deployed, making available yet further communication services and permitting existing communication services to be carried out better or more efficiently.

A radio communication system is an exemplary type of communication system. In a radio communication system, communication channels, referred to as radio channels, are defined upon radio links that extend between the sending and receiving stations of the radio communication system. The radio links are portions of the electromagnetic spectrum. And, in a radio communication system, portions of the electromagnetic spectrum are typically allocated by regulatory bodies, and, regularly, the communication capacity of the communication system is dependent upon the amount of spectrum, i.e., bandwidth, allocated for use by the communication system.

A radio communication system offers various advantages over a wireline counterpart. For instance, a communication system implemented as a radio communication system is generally of a reduced cost relative to its wireline counterpart. And, communications by way of a radio communication system are possible between locations at which formation of a wireline connection, needed in a wireline communication system to interconnect communication stations, would not be possible or practical. Additionally, a radio communication system is amenable for implementation as a mobile communication system. In a mobile communication system, one or more of the communication stations is permitted mobility in which communications by, or with, the communication station are permitted when the communication station is moving or otherwise does not remain at a fixed position.

A cellular communication system is an exemplary type of mobile radio communication system. A cellular communication system is a multi-user system in which mobile stations, typically portable transceivers of dimensions permitting their hand carriage by users, are used to communicate communication data. Successive generations of cellular communication systems have been developed and their networks deployed to encompass significant geographical areas of the world. While early-generation cellular communication systems primarily provided telephonic voice communication services and only limited data communication services, increasingly, new-generation cellular communication systems, and other analogous communication systems, increasingly provide for the effectuation of data-intensive communication services.

Other radio communication systems exhibit some characteristics analogous to those of cellular communication systems. For instance, wireless local area networks (WLANs) also provide for the effectuation of communication services with mobile stations. Data communication services are amongst the communication services that are available for effectuation by way of a wireless local area network.

In a data-intensive communication service effectuated in a cellular, or other, communication system, a challenge is to provide a manner by which to communicate the data both in a timely manner and in a manner permitting the informational content of the data to be recovered once delivered to a receiving station. MIMO (Multiple Input, Multiple Output) system implementations have been proposed for implementation in which a sending station simultaneously communicates on separate communication channels, howsoever defined, the communication data for delivery to a receiving station. The communication of the data upon the multiple channels form the multiple inputs. A receiving station that has multiple detecting mechanisms, operable in parallel to detect the communicated data form the multiple outputs of the communication system. Multiple inputs are provided, for instance, through use of space diversity techniques. Or, and of interest herein, in an OFDM communication system, separate channels are defined by orthogonally-spaced, frequency sub-carriers. Multiple inputs are provided by providing communication data for communication upon the different sub-carriers, and channels defined therefrom, of the OFDM scheme.

In a realizable communication system, the different communication channels upon which the communication data is communicated are not identical. That is to say, the different channels exhibit different channel characteristics, e.g., exhibit different levels of fading or other data-degrading-characteristics. While various techniques are available or proposed, by which to compensate for the communication conditions on the separate channels, there generally, to date, the problem has not been addressed in a comprehensive manner, that is, in a manner to select the data to be communicated upon the different communication paths that best achieves a selected performance criteria, such as throughput rate, error rate, transmit power level, etc.

What is needed, therefore, is an improved manner by which to allocate data for communication in a multiple input communication system to achieve best a performance parameter.

It is in light of this background information related to communications in a multiple input communication system that the significant improvements of the present invention have evolved.

SUMMARY OF THE INVENTION

The present invention, accordingly, advantageously provides apparatus, and an associated method, by which to communicate data in a multiple-input communication system, such as an MIMO (Multiple Input, Multiple Output) OFDM (Orthogonal Frequency Division Multiplexed) radio communication system.

Through operation of an embodiment of the present invention, a manner is provided by which to allocate data for communication upon separate ones of multiple channels defined in the multiple input communication system.

In one aspect of the present invention, data that is to be communicated is allocated for communication upon different ones of the channels and manners best to communicate the data according to a selected performance criteria.

Channels that exhibit better communication qualities are allocated with greater amounts of data, and channels that exhibit poorer communication qualities are allocated with lesser amounts of data.

Communication quality identifiers are constructed and are used to describe channel quality. And, an ordered list is formed containing entries that identify the channels and their qualities. The data is allocated for loading to be communicated upon the channels according to their ordering on the list.

In another aspect of the present invention, a set of communication quality identifiers (CQIs) is constructed for a MIMO channel. The communication quality identifiers describe the channel quality, and, in one implementation, the channel quality identifiers are provided for use when matrix modulations are utilized.

In an implementation in which the communication system utilizes OFDM or OFDM-like communications, ordering is performed to order the sub-carriers upon which channels are defined by which to communicate data, according to their communication quality indications. The ordering lists the channels in the sending, or other, order according to their communication quality identifiers. Relative communication qualities of the successive ones of the channels, listed as functions of their respective communication quality indications, are identified by their position in the ordered listing. The best sub-carriers, i.e., channels defined upon sub-carriers, that exhibit, e.g., lowest expected error rates, are listed in the ordered listing prior to channels that exhibit poorer levels of expected error rates.

For a set of the constructed communication quality indicators, the error functions that best fit simulated results are approximated. And, the error functions are averaged over all channel realizations with substantially, or approximately, the same communication quality indication reports.

Based upon the ordered listing, the data is allocated for communication upon different ones of the channels, e.g., sub-carriers when an OFDM scheme is utilized. The allocation of the data upon separate ones of the channels is made responsive to the order at which the channel is listed in the ordered listing. That is to say, when the ordered list lists the channels in descending order, i.e., the first-listed channel exhibits better channel conditions than the second-listed channel, etc, the first-listed channel is allocated a greater bit allocation than the second-listed channel, etc. Data allocations are made, for instance, proportionately, or in a step-wise fashion in which the channels listed on the ordered listing are grouped into sets, and different sets are allocated with different data allocations.

Data allocations are further made in manners best to achieve a selected performance criteria, such as to minimize an error rate at a given transmit power level to maximize data throughput rate at a selected transmit power level and target error rate, or to minimize the transmit power levels while achieving a target error rate.

Data allocation, defined, e.g., in terms of bit allocation, is made, for instance, though execution of an appropriate allocation algorithm.

Through correct initial ordering of the channels and the use of the ordering of the channels to allocate subsequently the data that is to be communicated on such channels better insures that the data communicated pursuant to effectuation of a communication service is best able to performed in a manner that achieves a selected performance criteria.

When implemented in an OFDM system, such as a radio cellular communication system of a wireless local area network that utilizes OFDM communication techniques, sub-carriers defined in the system are ordered in the ordered list according to their communication qualities, indicated by communication quality identifiers. And, the ordered listing is used to allocate and load data bits that are to be communicated during operation of the OFDM system. Sub-carriers that exhibit better communication qualities are loaded with greater amounts of data bits than sub-carriers that exhibit poorer communication qualities. And, the bit allocations are further decided in a manner best to achieve a selected performance criteria. Thereby, bit allocations are made in manners that permit improved communication performance of an OFDM, multiple input communication system relative to conventional manners by which to allocate data for communication upon the separate sub-carriers.

In these and other aspects, therefore, apparatus, and an associated method, is provided for a sending station of a multiple input radio communication system. Communication of data according to a selected performance criteria is facilitated. The data is communicated upon separate channels of a multiple number of channels. A channel sorter is adapted to receive indications of a communication quality indicia of each of the separate channels. The channel sorter orders the separate channels into an ordered list according to the communication quality indicia associated with the separate channels. A data loader is adapted to receive indications of the ordered list into which the separate channels are ordered by the channel sorter. The data loader loads selected data parts for communication by the sending station upon the separate communication channels. Selected data parts are selected for communication upon the separate communication channels best to achieve the selected performance criteria.

A more complete appreciation of the present invention and the scope thereof can be obtained from the accompanying drawings that are briefly summarized below, the following detailed description of the presently-preferred embodiments of the present invention, and the appended claims.

DETAILED DESCRIPTION

Figure 1:
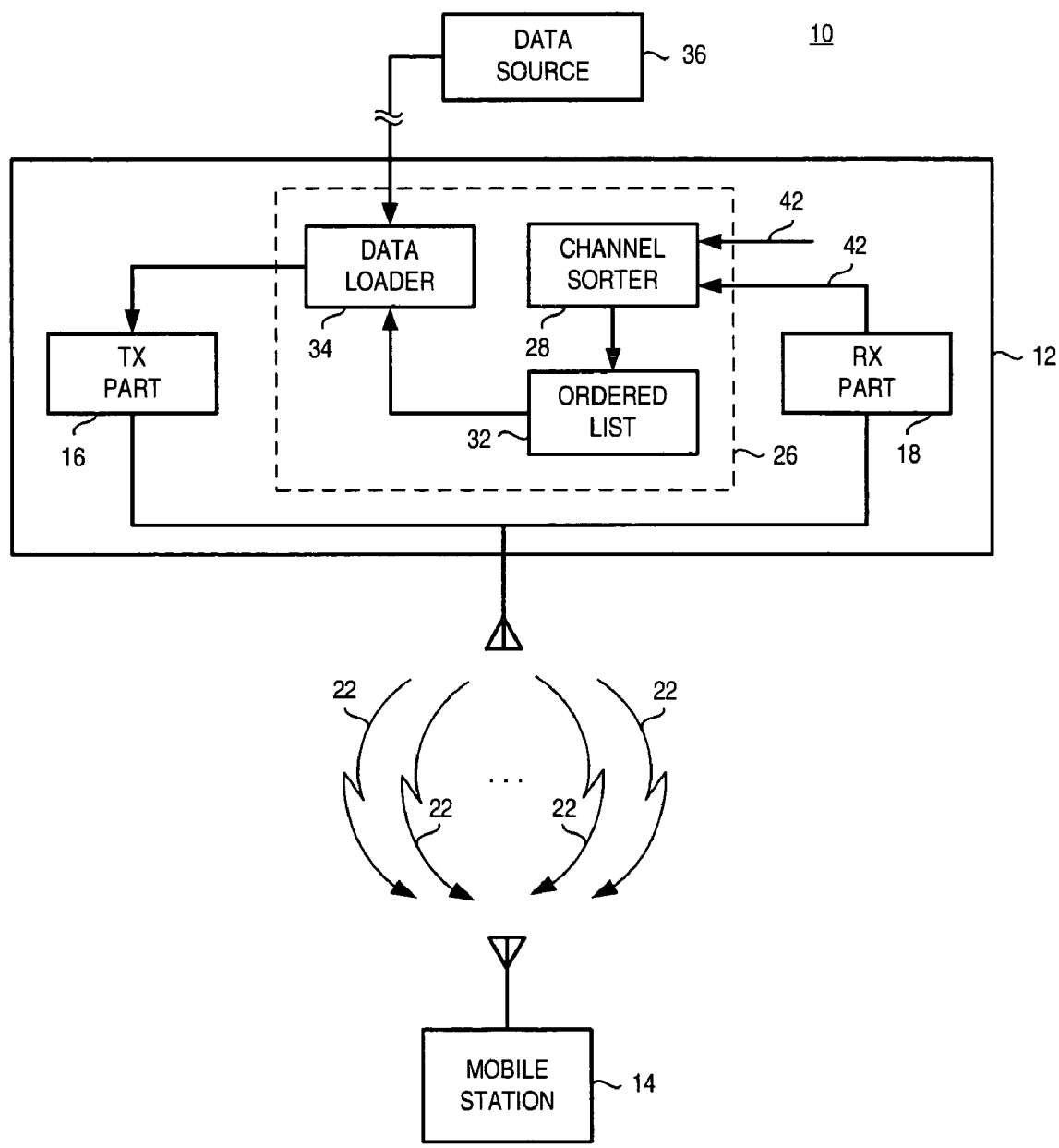
FIG. 1 illustrates a functional block diagram of a radio communication system in which an embodiment of the present invention is operable.

Referring first to FIG. 1, a radio communication system, shown generally at 10, provides for the communication of data between a set of communication stations, here communication stations 12 and 14. In the exemplary implementation, the communication system forms a cellular or cellular-like communication system in which the communication station 12 forms a network-based communication station, and the communication station 14 forms a mobile station that operates to communicate with the network-based communication station. While the following description of exemplary operation of an embodiment of the present invention shall be described with respect to its implementation in a cellular-like communication system, it should be understood that the teachings of the present invention are analogously also implementable in communication systems constructed in other manners.

That is to say, more generally, the communication station 12 is representative of any of various sending stations operable in a multiple-input communication system that utilizes radio, or wireline, communication channels by which to communicate data to a communication station. The communication station 12, while here represented to be a fixed-site communication station, is analogously also implementable as a communication station that is provided mobility, and the communication system is also representative of a communication system that is free of fixed infrastructure. When the communication systems forms a cellular communication system, for instance, the communication station is representative of a base station operable therein. And, when, e.g., the communication system is implemented as a wireless local area network, the communication station 12 is representative of an access point of the wireless local area network.

In the exemplary implementation, the communication stations each include transceiver circuitry, capable of two-way communication of data therebetween. The transceiver circuitry of the communication station 12 is here represented by a transmit part 16 and a receive part 18. While not separately shown, the receiver 14 includes analogous elements. Description of communication operations of forward link communications, i.e., communication of data by the communication station 12 to the communication station 14 is described. In one implementation, corresponding communication operations are effectuable by the communication station 14 to the communication station 12.

The communication system forms a multiple input, multiple output (MIMO) system in which communication data is communicated concurrently on a plurality of different channels by the communication station 12 on the forward link and multiple current detections of the communicated data at the receiving station. The arrows 22 are representative of the different communication channels upon which the communication data is communicated. In the exemplary implementation, an OFDM (Orthogonal Frequency Division Multiplexing) communication scheme is utilized in which orthogonal, or nearly-orthogonal, sub-carriers are defined and upon which separate channels are defined. The arrows 22, in this implementation, are therefore representative of the different OFDM sub-carriers upon which the channels are defined.

The channels typically do not exhibit identical channel characteristics. Different ones of the communication channels exhibit differing levels of, e.g., fading or other signal degradation causes and, the channel impulse response functions that define the different ones of the channels are of the different values. Because of the differing channel conditions of the different communication channels, the communication capacities of the different channels correspondingly also differ. Channels that exhibit poor conditions are capable of communicating lesser amounts of data within a given period and bandwidth than a corresponding channel that exhibits good channel conditions. While bit loading mechanisms, that is, mechanisms that load unequal amounts of data for communication on different ones of the channels are sometimes utilized, as noted above, these existing mechanisms fail generally optimally to allocate the data bits on the different channels.

To allocate better the data for communication on the different ones of the channels 22, the communication station 12 includes apparatus 26 of an embodiment of the present invention. The apparatus 26 is functionally represented, formed of functional elements. The functions or operations provided by the elements are implemented in any desired manner, such as by algorithms executable by processing circuitry. The apparatus 26 is also implementable at the communication station 14 to optimize better communications effectuated on channels of a reverse link when two-way communications are effectuated in a two-way MIMO scheme.

The apparatus 26 includes a channel sorter 28 that operates to form an ordered list 32 that identifies the channels 22 in an ordered fashion to identify, in sequential order, the channels in terms of their communication qualities. And, the apparatus includes a data loader 34 that accesses the entries on the ordered list an, responsive to the ordering of the list, causes loading of data, here indicated to be sourced at a data source 36, to be communicated by the transceiver part 16 upon the channels 22. Because the data loader operates responsive to the listing of the channels at the ordered list, the loading decisions made by the data loader take into account the communication quality of the channels. The decisions made by the data loader are further responsive to calculations of achieving a selected performance criteria, such as maximization of throughput rate, minimization of bit error rate, or minimization of transmit power levels.

The apparatus is operable even without full channel state information at the communication station 12. In the exemplary implementation, data transmitted by the transmit part is coded in frequency division through the use of matrix modulation, e.g., space-frequency block coding. For each modulation, an effective bit error rate function is constructed. Bit error rate functions are generally of the form:

$$P_b(x) = \exp\left(\frac{e_b}{x+d_b}\right) + c_b + a_b(x+d_b))$$

Wherein: b denotes the bit rate of the modulation: and x is related to the determinant of the equivalent channel matrix. The value of x is different for different types of matrix modulations.

Additionally, in the equation, the parameters $a_b$, $c_b$, $e_b$, and $d_b$ are fixed by finding values that provide the best correlations to actual simulated levels of error rates. For instance, an exemplary set of parameters when ABBAQPSK modulation is performed is $a_2=-2.0543$, $c_2=-1.3518$, $e_2=0.869$, and $d_2=0.5$. Exemplary parameters for ABBA 16-QAM modulation are: $a_2=-0.8944$, $c_2=-1.5966$, $e_2=0.6719$, and $d_2=0.5$. Exemplary parameters when the matrix modulation forms DABBQPSK are: $a_4=-2.7325$, $c_4=-1.0269$, $e_4=0.0591$, and $d_4=0.1$. And, exemplary parameters when the matrix modulation is formed of DABBA 16-QAM are: $a_8=-1.1937$, $c_8=-0.92196$, $e_8=0.0366$, and $d_8=0.1$.

During exemplary operation, the channel sorter is provided, here indicated by way of the line 42, with indications of channel qualities of the channels 22, here the sub-carriers upon which the channels are defined. The channels qualities are described, as noted, by a set of communication quality identifiers. And, the channel sorter operates to form the ordered list 32 in which the channels are ordered, according to their communication quality identifiers, in sequential manner. That is to say, the channels are listed sequentially in which a first-listed channel exhibits best communication qualities, a second-listed channel exhibits second-best communication qualities, etc. Reverse listings, or other ordered types of listing are, similarly, also possible. In any event, the ordered list identifies the channels in terms of their associated communication quality identifiers, and the ordered list is accessible by the data loader.

In a further embodiment of the present invention, the error functions, noted above, are approximated for a set of communication quality identifiers to best fit simulated results. The error functions are averaged over all channel realizations with the same, or approximately the same, communication quality identifier report.

The data loader 34 operates in a selected manner to cause loading of the data sourced at the data source for communication on the channels 22 to achieve a desired performance parameter. And, in the exemplary implementation, the data loader further operates to control the power levels at which the data is caused to be transmitted on the different ones of the channels 22. The power levels at which the allocated data is caused to be transmitted by the transmit part of the transceiver circuitry comprises, for instance, control signals generated by the data loader that control the amplification levels at which the transmit signals, containing the allocated data, amplify the data that is communicated upon the different sub-carriers, or channels otherwise defined.

In the exemplary implementation, the data bits are loaded to the sub-carriers by selecting suitable matrix modulations for each block of sub-carriers and also allocating power at which the signals, so-loaded with data bits. The bit loading and the power allocations are made to achieve best a selected performance criteria. For instance, either the rate is maximized with fixed power and target bit error rates, of the power is minimized, with fixed rate and target bit error rates, or the bit error rate is minimized with fixed power and rate. The power and bit allocations are based on calculated approximate expressions of error functions. And, the bit allocation is effectuated using any suitable algorithm. Methods that include the inversion of error functions and using them directly are, for instance, available.

In one implementation, as noted, a single type of matrix modulation is utilized. In another implementation, however, different matrix modulations are permitted. Different ones of the matrix modulations exhibit different communication quality indications, thereby complicating construction of the error functions as the error functions are not necessarily continuous. For example, an exemplary set of allowed transmission modes is: no transmission; ABBA with QPS K modulation using a black of four sub-carriers, i.e., with a bit rate of 8: DABBA with QPS K modulation, using a block of four sub-carriers, i.e., exhibiting a bit rate of 16; and DABBA with 16-QAM modulation, using a block of four sub-carriers, i.e.,exhibiting a bit rate of 32. The use of different matrix modulations is advantageous for the reason that higher total data rates are possible.

And, in a further embodiment, channel coding is taken into account when loading the data bits and allocating power in an MIMO-OFDM system, or other system that utilizes multiple input communication techniques. In this further implementation, effective functions that describe the packet error rate are required to be constructed. In addition to the termination of the number of information bits, a determination of the optimal number of parity bits to be used must also be determined. And, the corresponding power allocation to the information in parity bits correspondingly also must be determined.

Figure 2:
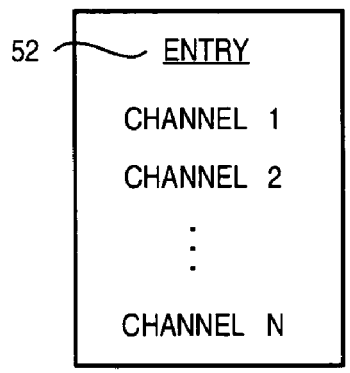
FIG. 2 illustrates a representation of an ordered list that lists entries of communication channels to which data is allocated for communication thereon pursuant to operation of an embodiment of the present invention.

FIG. 2 illustrates an exemplary ordered list 32 formed pursuant to, and used pursuant to operation of, an embodiment of the present invention. Here, a plurality of ordered entries 52 are shown. Each entry defines a channel 22, and the channels are ordered successively from a channel that exhibits best communication conditions to a channel that exhibits poorest conditions. The ordered list is accessed and the data allocations for data to be communicated thereon is made responsive to the ordering of the channel in the ordered list.

Figure 3:
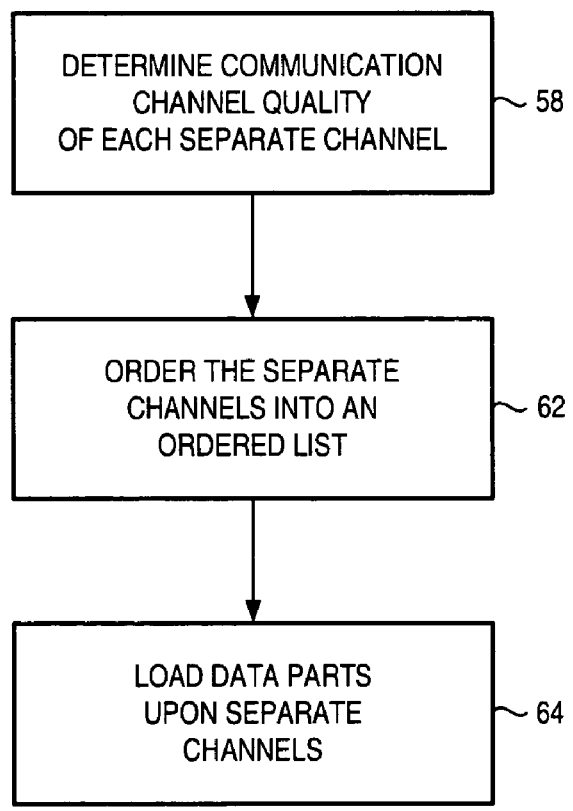
FIG. 3 illustrates a method flow diagram listing the method of operation of an embodiment of the present invention.

FIG. 3 illustrates a method flow diagram, shown generally at 56, representative of the method of operation of an embodiment of the present invention. The method facilitates communication of data according to a selected performance criteria by a sending station of a multiple input radio communication system. The data is for communication upon separate channels of a multiple number of channels.

First, and as indicated by the block 58, the communication quality indicia of each of the separate channels is determined.

Then, and as indicated by the block 62, the separate channels are ordered into an ordered list according to communication quality indicia associated with the separate channels. And, as indicated by the block 64, the selected data parts are loaded for communication by the sending station upon the separate communication channels. The selected data parts are selected for communication upon the separate communication channels in manners best to achieve the selected performance criteria.

Thereby, communications in the communication system are improved. The data allocations for communication upon the separate communication channels is made responsive to the communication conditions of the different channels in manner to achieve the selected performance criteria. More efficient utilization of the allocated bandwidth, allocated to the communication system, is thereby provided.

The previous descriptions are of preferred examples for implementing the invention, and the scope of the invention should not necessarily be limited by this description. The scope of the present invention is defined by the following claims.

We claim:

1. An apparatus, comprising:
a channel sorter configured to receive indications of a communication quality indicia of separate communication channels, said channel sorter being configured to order the separate communication channels into an ordered list according to the communication quality indicia associated with the separate communication channels; and
a data loader configured to receive indications of the ordered list into which the separate communication channels are ordered by said channel sorter, said data loader being configured to load selected data bits for communication by a sending station upon the separate communication channels, the selected data bits selected for communication upon the separate communication channels to achieve a selected performance criteria,
wherein the ordered list comprises descending communication quality levels beginning with the highest communication quality level.

2. The apparatus of claim 1, further comprising:
a communication quality determiner configured to determine the communication quality indicia of each of the separate communication channels,
wherein the indications of the communication quality indicia to which said channel sorter is configured to receive comprise determinations made by said communication quality determiner 3. The apparatus of claim 2 wherein the communication quality indicia determined by said communication quality determiner is determined responsive to communication quality indications inserted into data communicated during operation of the multiple input radio communication system.

4. The apparatus of claim 1 wherein selection of the selected data bits for communication upon the separate communication channels is responsive to a listing order in which the separate communication channels are listed on the ordered list.

5. The apparatus of claim 4 wherein the separate communication channels are listed successively as functions of communication quality indicia associated therewith, and wherein selection of the selected data bits for communication upon the separate communication channels is made responsive to location of entity of the separate communication channels upon the ordered list.

6. The apparatus of claim 1 wherein selection of the selected data bits is made as functions of quantity and wherein quantities of data bits selected for communication upon separate ones of the separate communication channels are proportional to the communication quality indicia associated with the separate communication channels.

7. The apparatus of claim 6 wherein said data loader is configured to load greater quantities of data bits for communication channels indicated in the ordered list to exhibit communication quality indicia greater than at least a first threshold therein for communication channels indicated in the ordered list to exhibit communication quality indicia less than the first threshold.

8. The apparatus of claim 1 wherein the selected performance criteria, pursuant to which the selected data bits are selected to be loaded for communication by said data loader are selected to achieve, comprises a maximal communication data throughput rate at a selected transmission power level.

9. The apparatus of claim 1 wherein the selected performance criteria, pursuant to which the selected data bits are selected to be loaded for communication by said data loader are selected to achieve, comprises a minimal transmission power level at a selected minimal error rate.

10. The apparatus of claim 1 wherein the selected performance criteria, pursuant to which the selected data bits are selected to be loaded for communication by said data loader are selected to achieve, comprises a minimal error rate at a selected transmission power level.

11. The apparatus of claim 1 wherein the multiple input radio communication system comprises a frequency division multiplied system that defines a plurality of sub-carriers, each of which defines a separate communication channel, and wherein the ordered list into which said channel sorter orders the separate communication channels comprises an ordered list of sub-carriers.

12. A method, comprising:
ordering, by a sorter, separate communication channels into an ordered list according to communication quality indicia associated with the separate communication channels; and
loading selected data bits for communication by a sending station upon the separate communication channels, the selected data bits selected for communication upon the separate communication channels in manners to achieve a selected performance criteria,
wherein said ordering comprises ordering the separate communication channels by descending communication quality levels beginning with the highest communication quality level.

13. The method of claim 12, further comprising:
prior to said operation of ordering, determining the communication quality indicia of each of the separate communication channels.

14. The method of claim 13 further comprising inserting communication quality indications into data communicated during operation of the multiple input radio communication system and wherein the communication quality indicia determined during said operation of determining is determined responsive to the communication quality indicators.

15. The method of claim 12 further comprising selecting the data bits to be loaded during said loading.

16. The method of claim 15 wherein the data bits selected during said selecting to be loaded for communication for communication upon individual ones of the separate communication channels are selected in manners proportional to values of the communication quality indicia associated with the individual ones of the separate communication channels.

17. The method of claim 12 wherein the multiple input radio communication system comprises a frequency division multiplexing system that defines a plurality of sub-carriers, each of which defines a separate communication channel and wherein the ordered list ordered during said ordering comprises an ordered list of sub-carriers.

18. An apparatus, comprising:
sorting means for receiving indications of a communication quality indicia of separate communication channels, said sorting means further for ordering the separate communication channels into an ordered list according to the communication quality indicia associated with the separate communication channels; and
loading means for receiving indications of the ordered list into which the separate communication channels are ordered by said channel sorter, said loading means further for loading selected data bits for communication by a sending station upon the separate communication channels, the selected data bits selected for communication upon the separate communication channels to achieve a selected performance criteria,
wherein the ordered list comprises descending communication quality levels beginning with the highest communication quality level.

* * * * *